United States Patent [19]
Gehr, Jr. et al.

[11] Patent Number: 6,120,041
[45] Date of Patent: Sep. 19, 2000

[54] CONVERTIBLE CHILD CARE DEVICE

[75] Inventors: Arthur L. Gehr, Jr., East Earl; Michael L. Longenecker, Ephrata, both of Pa.

[73] Assignee: Graco Children's Products Inc., Elverson, Pa.

[21] Appl. No.: 09/137,287

[22] Filed: Aug. 20, 1998

[51] Int. Cl.$^7$ ...................................................... B62B 7/00
[52] U.S. Cl. ........................... 280/30; 280/647; 280/648; 280/650; 280/658
[58] Field of Search .................................... 280/643, 644, 280/647, 648, 650, 47.4, 655.1, 657, 658, 30; 403/104, 106, 109, 329; 296/35.4; 297/487, 184.13

[56] References Cited

U.S. PATENT DOCUMENTS

| | | | |
|---|---|---|---|
| D. 288,544 | 3/1987 | Nakao et al. | D12/129 |
| D. 300,310 | 3/1989 | Kassai | D12/129 |
| D. 305,013 | 12/1989 | Bigo et al. | D12/129 |
| D. 308,656 | 6/1990 | Takahashi et al. | D12/129 |
| D. 310,645 | 9/1990 | Julien | D12/129 |
| D. 317,280 | 6/1991 | Takahashi et al. | D12/129 |
| D. 325,550 | 4/1992 | Kato et al. | D12/129 |
| D. 329,832 | 9/1992 | Ishikura et al. | D12/129 |
| D. 344,701 | 3/1994 | Church | D12/129 |
| D. 352,923 | 11/1994 | Kassai | D12/129 |
| D. 360,173 | 7/1995 | Nishio et al. | D12/129 |
| D. 382,837 | 8/1997 | Haut et al. | D12/129 |
| D. 396,026 | 7/1998 | Arvai | D12/129 |
| D. 396,206 | 7/1998 | Song | D12/129 |
| 2,616,719 | 11/1952 | Heideman | 280/36 |
| 2,989,318 | 6/1961 | Schenkman | 280/41 |
| 4,725,071 | 2/1988 | Shamie | 280/643 |
| 4,770,429 | 9/1988 | Freyman | 280/5.28 |
| 4,779,879 | 10/1988 | Kassai | 280/47.36 |
| 4,832,354 | 5/1989 | LaFreniere | 280/30 |
| 4,836,573 | 6/1989 | Gebhard | 280/644 |
| 4,903,980 | 2/1990 | Schwartz | 280/647 |
| 5,167,425 | 12/1992 | Chen | 280/648 |
| 5,201,535 | 4/1993 | Kato et al. | 280/30 |
| 5,203,577 | 4/1993 | Kato et al. | 280/30 |
| 5,431,478 | 7/1995 | Noonan | 297/130 |
| 5,472,224 | 12/1995 | Cabagnero | 280/642 |
| 5,718,439 | 2/1998 | Wang | 280/47.38 |
| 5,772,235 | 6/1998 | Espenshade | 280/643 |
| 5,820,144 | 10/1998 | Wang | 280/47.38 |

FOREIGN PATENT DOCUMENTS

| | | |
|---|---|---|
| 2 254 587 | 10/1992 | United Kingdom . |
| 2 310 172 | 8/1997 | United Kingdom . |
| 2 320 000 | 6/1998 | United Kingdom . |

*Primary Examiner*—Richard M. Camby
*Attorney, Agent, or Firm*—Foley & Lardner

[57] ABSTRACT

A child care device with an improved mounting system is disclosed. The improved mounting arrangement includes a child carrier having at least one side wall having at least one slot on the side wall. The invention also includes at least one support mechanism connected to a frame and adapted to engage the slot and cooperates with a release mechanism having a piston to releasably secure the child carrier to the support mechanism. In addition, the child care device includes an adjustable arm bar having an arm bar actuator that releasably engages the arm bar such that the arm bar is telescopically slidable relative to the child care device.

39 Claims, 15 Drawing Sheets ary and various folded configurations. One such device is disclosed in U.S. Pat. No. 5,772,235 to Espenshade and commonly assigned to the Assignee of the present invention. The device to Espenshade suggests providing a convertible child care device that allows for conversion between a plurality of configurations. Specifically, such devices include a frame structure, a backrest portion connected to the frame structure at a first pivot point to allow the back rest portion to recline between an upright and reclined position, a foot rest portion connected to the frame structure at a second pivot point to allow the foot rest portion to rotate between a lowered position and an elevated position, and an arm bar slidably connected to the frame structure to allow the arm bar to move between a closed position and an extended position. The arm bar is retained in position by a button which engages indentations on the arm bar. Associated with the button is a spring which operates to bias the button into an engaged position relative to the arm bar.

CONVERTIBLE CHILD CARE DEVICE

BACKGROUND OF THE INVENTION

1. Field of the Invention

This invention relates to child care devices. More specifically, the present invention relates to a child care device that can be conveniently and rapidly converted between a variety of differing configurations.

2. The Prior Art

Conventional child care devices such as strollers, bassinets, and the like commonly include a child carrier and a mechanism to attach the child carrier to a frame. Typically, the mechanism comprises a plurality of wires and latches which engage the latches. Generally, two transverse wires extend across the bottom of the child carrier positioned to correspond with two wire receptacles attached to the frame and open upward. The wire receptacles are oriented to receive each of the wires on the bottom of the child carrier. Once the wires are coupled within the wire receptacles, the user then latches all of the receptacles closed with a cover that extends across the open portion of the wire receptacles, thereby securing the child carrier to the frame.

Such devices have several disadvantages. First, such child carriers are prone to tilting and could spill children who were unattended and whose carriers were improperly latched down to the frame. Often, the carrier rotates about one of the wires and spills the child out of the carrier. This situation could only be prevented if all of the latches of all of the receptacles were securely closed. Closing all of the latches is time consuming and inconvenient because the operator has to walk around the carrier and close numerous latches. Also, operators sometimes unintentionally neglect to latch the carrier to the frame.

To overcome the disadvantages inherent in such devices, various other devices have been proposed. One such device is disclosed in U.S. Pat. No. 5,860,695 to Espenshade et al. commonly assigned to the Assignee of this application and herein incorporated by reference. Espenshade discloses a convertible child care device which includes a child carrying mechanism, a frame, and a support mechanism connected therebetween. More particularly, the child carrying device includes a bottom portion interconnected between a pair of opposed side walls.

Each of the side walls includes an inner casting having a plurality of slots and an outer casting having a plurality of ribs, and a button release mechanism disposed therebetween having a plurality of ramp portions. The support extension is connected to the frame and includes a plurality of buttons corresponding to the plurality of slots. Each of the buttons are adapted to engage a corresponding slot such that the child carrier may be releasably connected to the frame. Lastly, the device includes an actuator having a handle operatively associated with the button release mechanism which interacts with the support mechanism. The handle may be digitally actuated by the user sliding the button release mechanism relative to the outer casting thereby disengaging the buttons from the outer casting such that the child carrier may be removed from the support mechanism. Alternatively, when the button release mechanism is deactivated by the user, the buttons will thereby reengage the outer casting such that the child carrier is secured to the frame.

As can be best appreciated by one skilled in the art, such devices allow for convenient mounting and removal of the child carrier to the frame. The user simply lifts the child carrier by using the handle portion of the actuator to remove the child carrier from the frame. Installation of the child carrier is also safe and convenient. The user simply lowers the child carrier by the handle portion onto the support mechanism. Both operations of installing and removing the child carrier may be performed through a single action i.e., installation and removal are both performed in a single step and are practically automatic. Although the device to Espenshade provides several advantages over the prior art, one skilled in the art can appreciate that various advancements in the art would still be desirable. Specifically, both the actuator and the side panels of such devices include several different members.

It has also been found to be desirable to include a variety of other features on a child care devices. For instance, some conventional child care devices are capable of being changed between several different configurations such as various reclining configurations and various folded configu This device to Espenshade also has substantially advanced the art. However, it has been found that it would be desirable to further enhance such child care devices. Although such devices operate effectively, several different parts are required in the release mechanism and latch mechanism to function effectively. For example, such devices require a separate button and a separate spring member. One skilled in the art can appreciate that multiple component parts creates additional cost and makes assembly and use more complicated.

In light of the above, it would be desirable to have a child care device which provides a substantial amount of versatility. In addition, it would be desirable to have a child care device which is convertible between a stroller configuration and a bassinet configuration. It would also be desirable to have a device which may be reversible such that the child carrier may be positioned with the child either facing towards the frame or away from the frame at the option of the user. Further, it would also be desirable for any such convertible child care device to be capable of being easily converted between the various configurations by a single user. Lastly, it would be desirable to provide the above described advantages while also reducing the number of parts utilized thereby reducing cost and the opportunity for mechanical failure.

SUMMARY OF THE INVENTION

Accordingly, an object of the present invention is directed to a child care device that substantially obviates one or more of the problems due to limitations and disadvantages of the related art.

Another object of the present invention is to provide a child care device which may be converted between a stroller configuration and a bassinet configuration.

Still another object of the present invention is to provide a child care device having a child carrier and a frame wherein the child carrier is reversible relative to the frame.

Yet another object of the present invention is to provide a child care device which may be converted by a single user through an uncomplicated operation.

Still a further object of the present invention is to provide a child care device as described above which achieves the above described advantages while also reducing the number of parts necessary.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The present invention provides a child care device having a frame and a child carrier having a pair of side walls and a bottom portion interconnected therebetween. The child carrier further includes a backrest pivotably connected to the side walls. Each of the side walls include at least one slot. The child care device further includes a support mechanism attached to the frame. Generally, the support mechanism includes a pair of supports. Each of the supports has at least one post disposed thereon. Each of the posts is sized and shaped to be receivable within a corresponding slot of the child carrier.

In one embodiment, the child care device also includes a release mechanism interconnecting the child carrier to the support mechanism, the release mechanism includes at least one handle disposed adjacent a corresponding side wall. Further, the release mechanism includes at least one piston disposed between the corresponding side wall and the release mechanism. The piston extends into the corresponding slot such that the post is releasably secured within the slot by the piston. In another embodiment of the present invention, the child care device includes an arm bar slidably coupled to the child carrier and at least one arm bar actuator. The arm bar actuator is secured to the child carrier and releasably engages the arm bar such that the arm bar may be telescopically adjusted relative to the child carrier.

In use, the user of the above described invention is provided with a child care device which is substantially versatile. The user may assemble the child care device in the stroller configuration merely by sliding the at least one slot over the at least one post of the support mechanism with the backrest proximate the frame. Once so oriented the piston of the release mechanism is simultaneously activated thereby capturing the at least one post within the corresponding slot. The user may pivot the back rest relative to the child carrier between a fully reclined position to a fully upright position. Alternatively, when the user desires to reverse the orientation of the child carrier relative to the frame, the user will simply deactivate the piston to remove the child care device and then rotate the child care device 180 degrees relative to the frame and replace the child carrier on this rotated orientation back into secure engagement with the support mechanism. Further enhancing the versatility of the present invention, the user may telescopically extend the arm bar when the child carrier is in the fully reclined position thereby converting the child care device into a bassinet.

As best appreciated by one skilled in the art the present invention provides several advantages. One advantage of the present invention is that it provides the user with a substantial amount of versatility. Specifically, the child care device may be configured in the stroller configuration or a bassinet configuration at the option of the user. Another advantage of the child care device is that it may be oriented in a forward orientation such that the child faces away from the frame or in a reverse orientation such that the child faces towards the frame. Still another advantage of the present invention is that the user may easily convert the child care device between the various orientations by an uncomplicated operation. Lastly, the child care device achieves the above advantages while also reducing the number of parts. Specifically the number of parts utilized in the release mechanism and the arm bar actuator has been substantially reduced.

It is to be understood that both the foregoing general description and the following detailed description are exemplary and explanatory and are intended to provide further explanation of the invention as claimed.

DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DESCRIPTION OF THE PREFERRED EMBODIMENT

Reference will now be made in detail to the preferred embodiments of the present invention, examples of which are illustrated in the accompanying drawings. Wherever possible, the same reference numbers will be used throughout the drawings to refer to the same or like parts. The invention will now be further clarified by the following example, which is intended to be purely exemplary of the invention.

Figure 1:
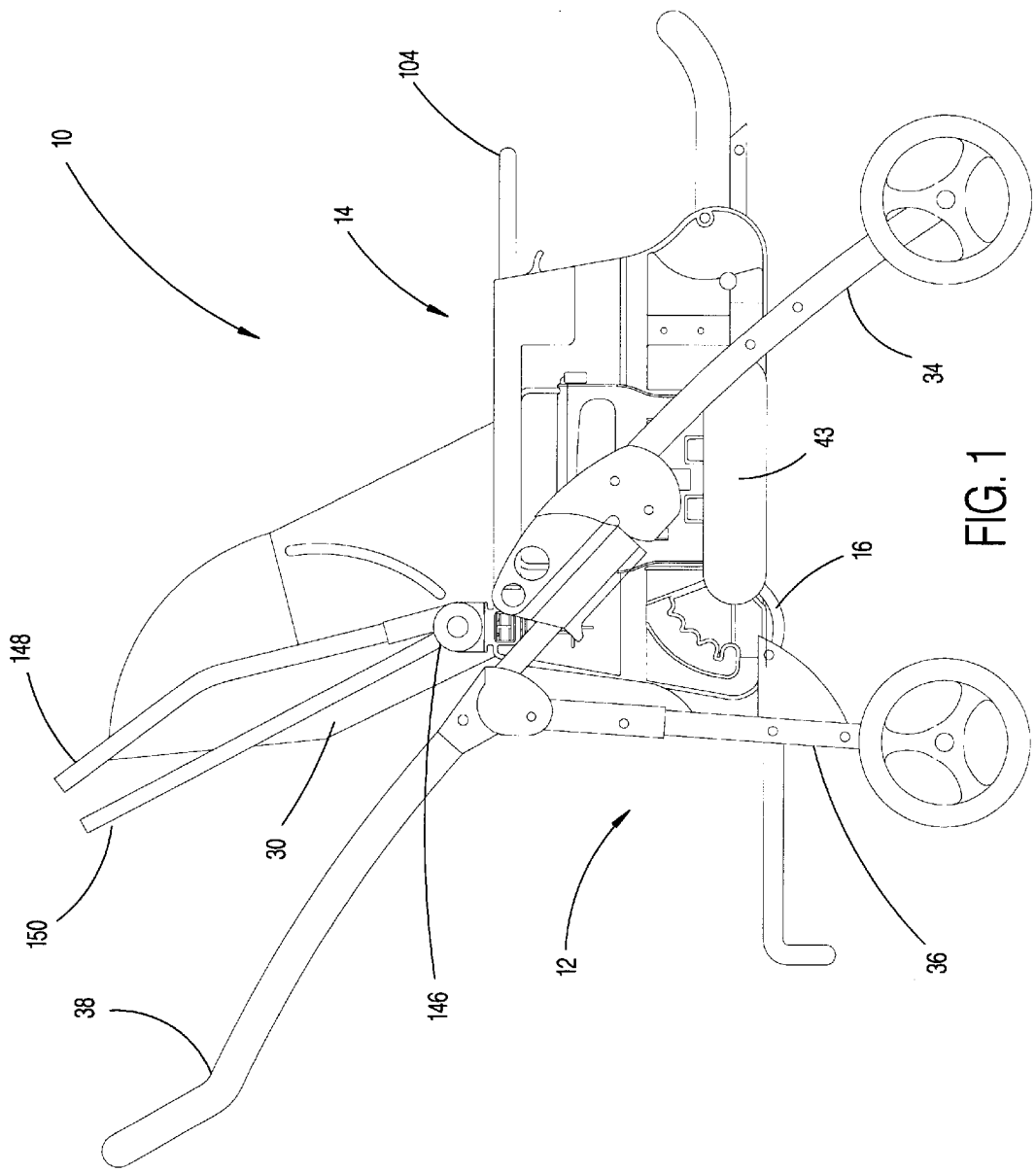
FIG. 1 is a side elevational view of a child care device with the child carrier in the stroller configuration.
Figure 3:
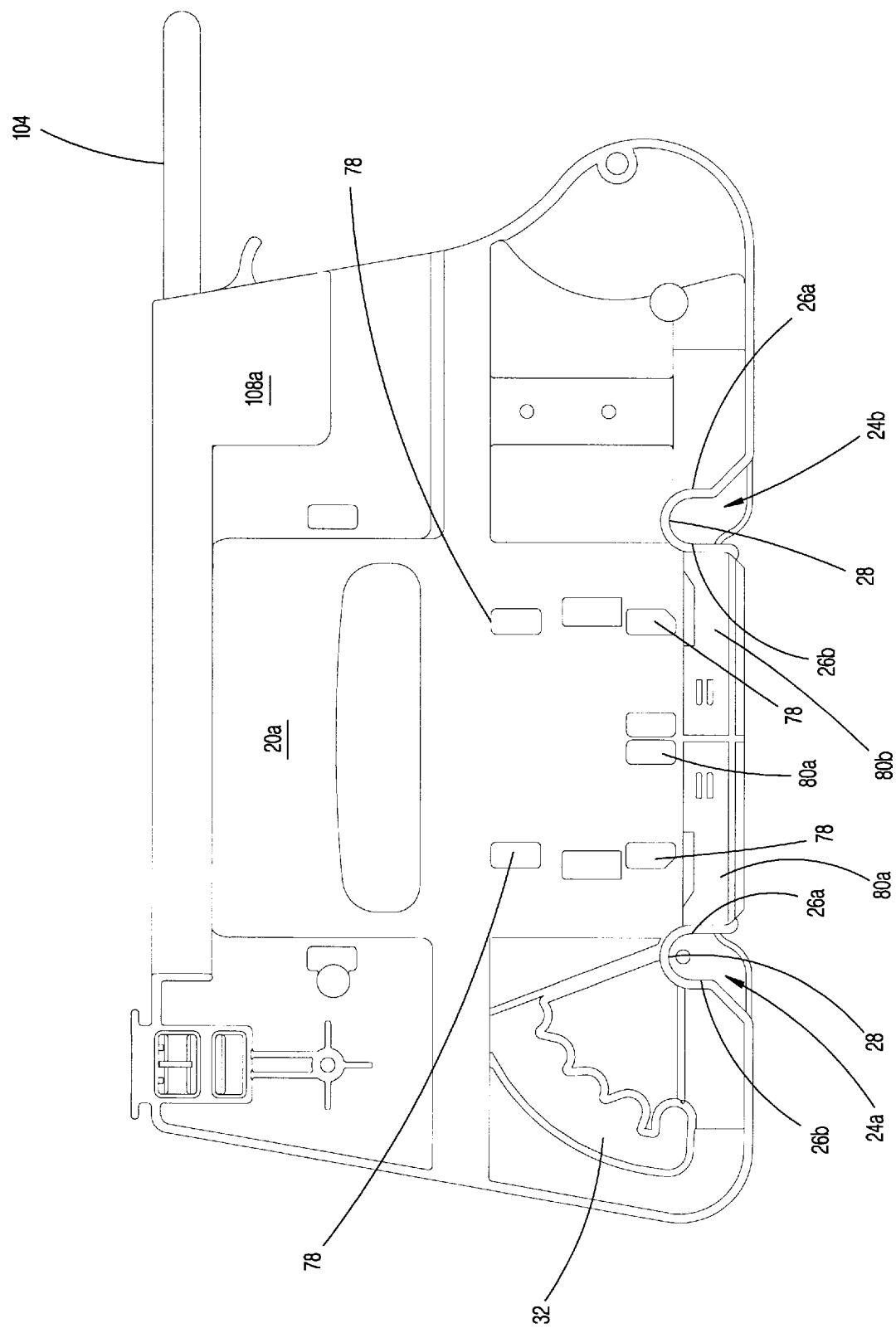
FIG. 3 is a side elevational view of a side wall of the child carrier having a face plate attached over a portion of a handle and an arm bar coupled to the child carrier.
Figure 14:
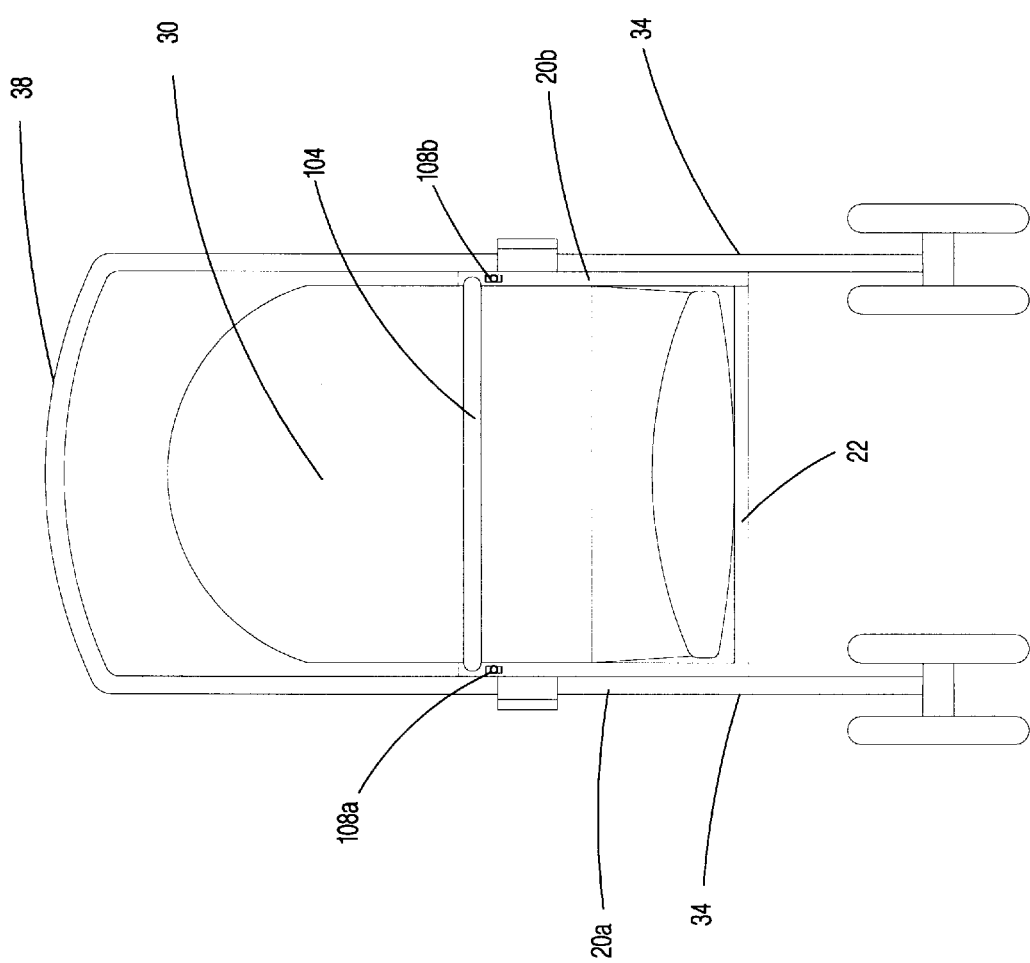
FIG. 14 is a front elevational view of the child carrier.

As best appreciated with reference to FIGS. 1 and 14, the present invention provides a child care device 10. Generally, the child care device 10 includes a frame 12, a child carrier 14, a support mechanism 16 attached to the frame 12, and a release mechanism 18 attached to the child carrier 14 and interconnecting the child carrier 14 to the support mechanism 16. More specifically, the child carrier 14 includes a pair of side walls 20a, 20b interconnected by a bottom portion 22. Each of the side walls 20a, 20b include at least one slot. As shown in FIG. 3, each side wall 20a, 20b preferably includes a pair of slots 24a, 24b. Generally, each slot 24a, 24b is approximately U-shaped and defined by a pair of side portions 26a, 26b interconnected by a radiused portion 28. At least one of the pair of side portions 26a, 26b includes an opening, not shown. Most preferably, the pair of side portions 26a, 26b are flared outward as shown in FIG. 3.

Figure 2:
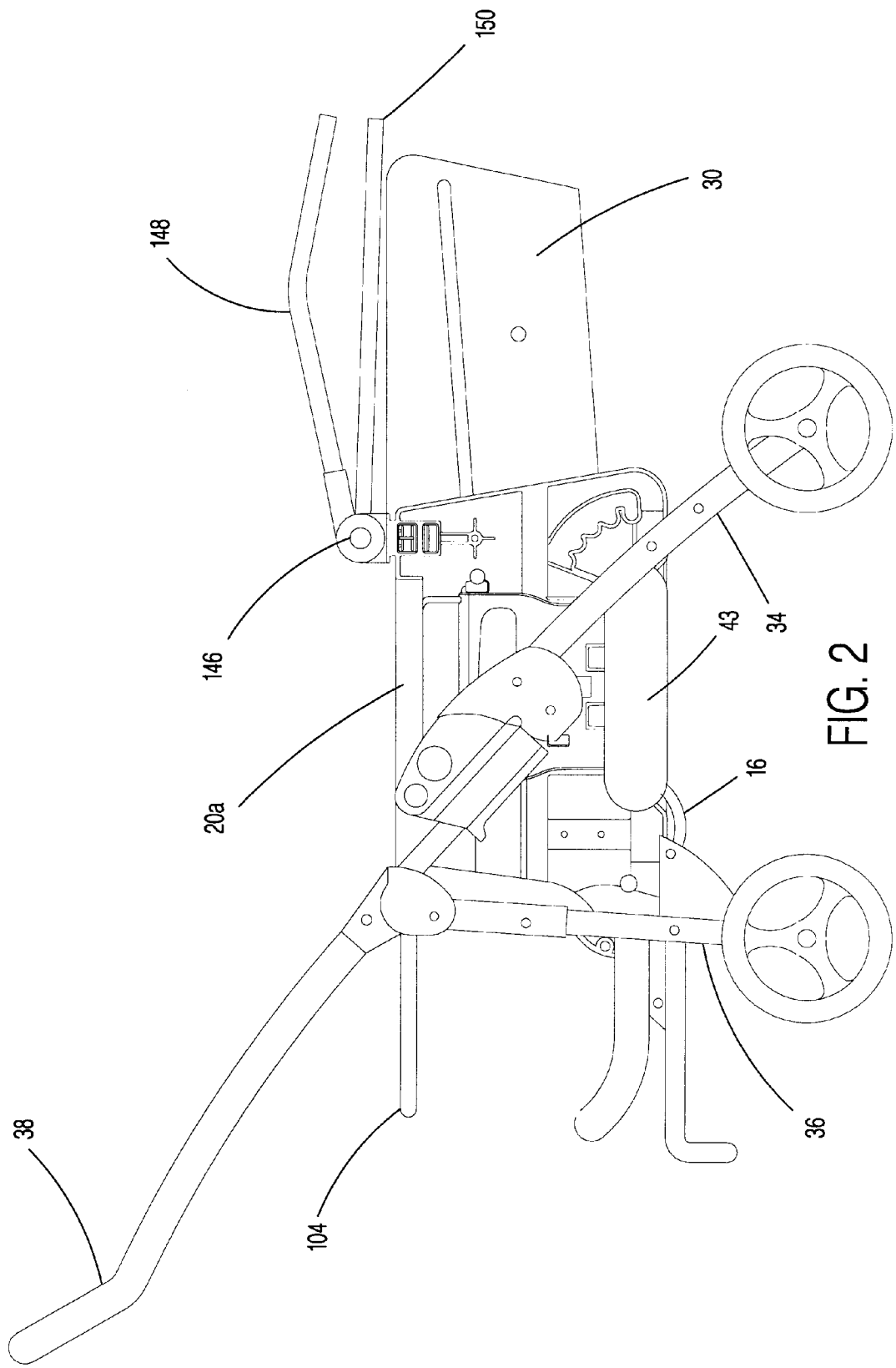
FIG. 2 is a side elevational view of the child care device with the child carrier in the bassinet configuration.

In the preferred embodiment, the child care device 10 includes a back rest 30 which is pivotally connected to the child carrier 14 (for clarity, only the back rest frame 14 is shown) such that the back rest 30 can move from an upright position to an reclined position as seen by comparing FIG. 1 and FIG. 2. Specifically, the back rest 30 is connected to the child carrier 14 by use of a rooster tail 32. The back rest 30 can slide radially outward to disengage a pin (not shown) into and out of the slots of the rooster tail 32. The back rest 30 is a two piece, spring loaded assembly that allows the pin to move axially along the longitudinal length of the back rest 30.

In the preferred embodiment, the frame 12 includes at least one forward leg 34 pivotally connected to a handle bar 36 and at least one rear leg 38 pivotally connected to the handle bar 36. The pivotable connection between the handle bar 36 and the legs 34, 36 allows the child care device 10 to be biased between an operating position, as shown in FIGS. 1 and 2, and a collapsed position, not shown.

Figure 15:
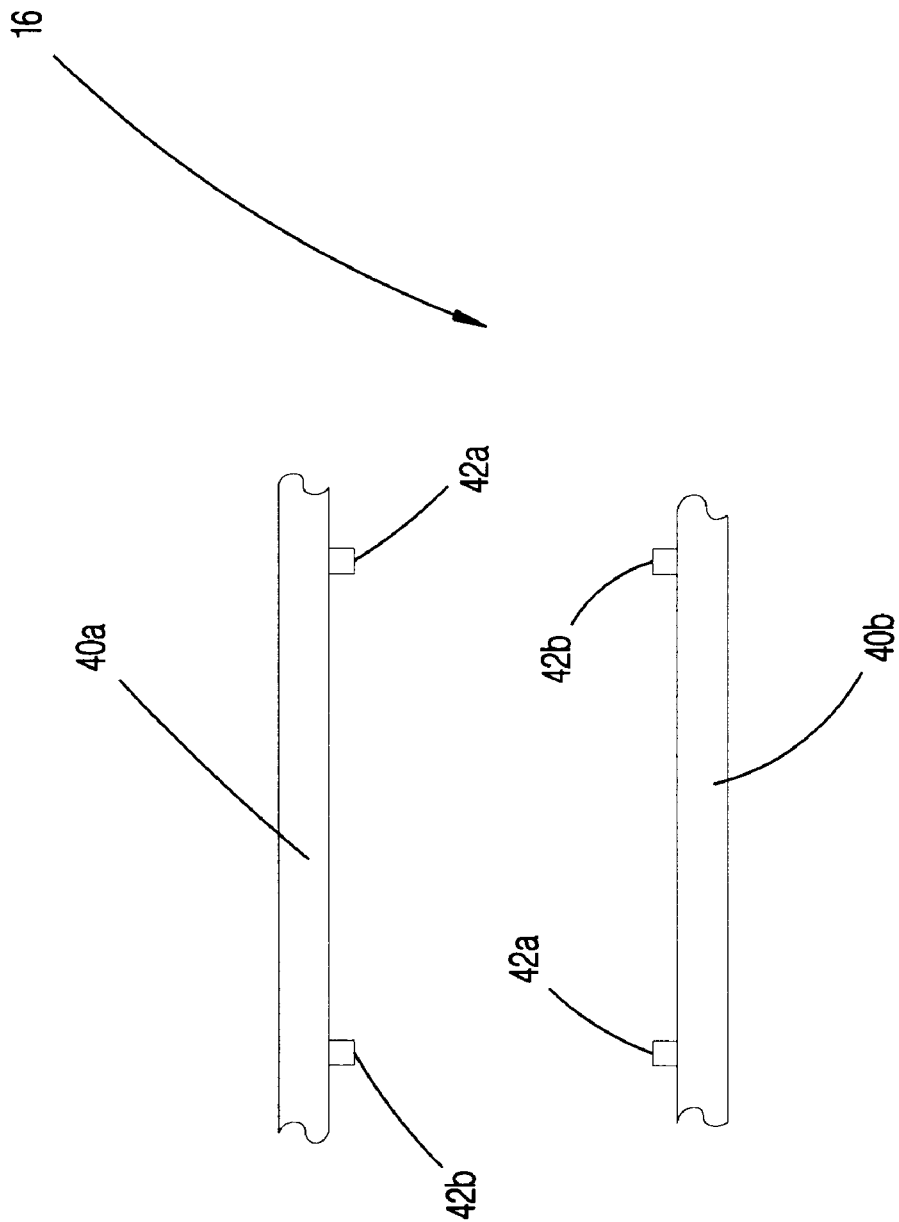
FIG. 15 is a fragmentary top plan view of the support mechanism.

As best appreciated with reference to FIG. 15, the present invention includes a support mechanism 16 attached to the frame 12. Specifically, the support mechanism 16 includes at least one support 40a, 40b attached between the rear leg 38 and forward leg 34. Each support 40a, 40b includes at least one post. Preferably, each support member 40 includes a pair of posts 42a, 42b. The posts 42a, 42b are generally cylindrical in cross-section. However, various other shapes may be utilized without departing from the teachings of this invention. In the preferred embodiment, each support 40a, 40b of the support mechanism 16 is substantially covered by a face plate 43. As shown in FIGS. 1 and 2, the face plate 43 is shown covering support member 40a. However, it should be understood that a similar face plate, not shown, substantially covers the support member 40b.

In one embodiment, the child care device 10 includes a release mechanism 18 which operates to connect the child carrier 16 to the support mechanism 16. Specifically, the release mechanism 18 includes a handle 46, at least one piston 48 engaged with the handle 46, and at least one spring 50 operatively interconnected between the at least one piston 48 and the corresponding side wall of the pair of side walls 20a, 20b.

Figure 10:
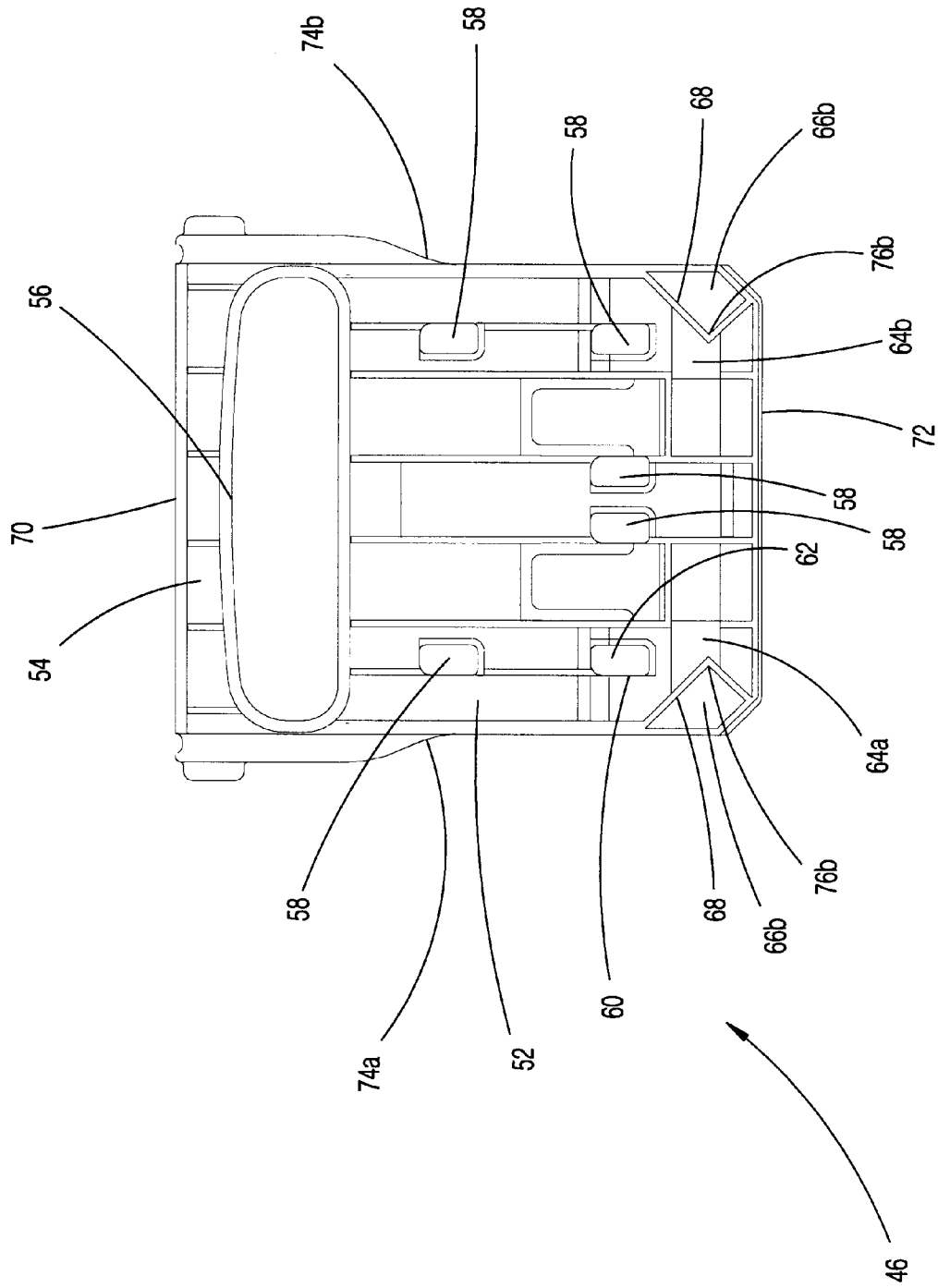
FIG. 10 is a rear elevational view of the handle.

Preferably, as best appreciated with reference to FIG. 10, the handle 46 includes a body 52 having a gripping portion 54 defined by an aperture 56. The body 52 further includes a plurality of L-shaped members 58. The L-shaped members comprise a first portion 60 approximately perpendicularly disposed relative to the body 52 and a second portion 62 attached to the first portion 60 and approximately disposed coplanarly relative to the body 52. As shown in FIG. 10, the body preferably includes six L-shaped members 58. However, one skilled in the art can appreciate that either greater or fewer L-shaped members 58 may be utilized without departing from the teachings of this invention. The handle 46 further includes at least one depression and at least one triangular portion having a bearing surface. As shown in FIG. 10, the handle 46 preferably includes a pair of depressions 64a, 64b. Disposed adjacent each depression 64a, 64b is a corresponding triangular portion 66a, 66b. Each of the triangular portions 66a, 66b provides a bearing surface 68a, 68b having an apex 76a, 76b facing one another, respectively. Most preferably, the body 52 is approximately rectangular in shape having a top edge 70 and a bottom edge oppositely disposed relative to the top edge 70. The top edge 70 and the bottom edge 72 are interconnected by a pair of side edges 74a, 74b. Each bearing surface of the pair of bearing surfaces 68a, 68b is disposed proximate the bottom edge 72 of the handle 46 and angled at approximately 45 degrees relative to the bottom edge 72.

The child carrier 10 further includes a corresponding plurality of L-shaped members 78. Most preferably, the plurality of corresponding L-shaped members 78 are six L-shaped members 78 disposed on each side wall of the pair of side walls 20a, 20b corresponding to the location of the plurality of L-shaped members 58 of the handle 46. The plurality of corresponding L-shaped members 78 are sized and shaped to correspond to the L-shaped members 58 of the handle 46 such that each L-shaped member 58 may be coupled to the corresponding L-shaped member 78. Once in this orientation, the handle 46 is thereby slidably connected to the corresponding side wall of the pair of side walls 20a, 20b. In addition, as best appreciated with reference to FIG. 4, each side wall of the pair of said walls 20a, 20b includes at least one channel. Preferably, a pair of channels 80a, 80b are provided. Each of the channels of the pair of channels 80a, 80b is sized and shaped to receive a corresponding piston 48. Most preferably, each of the channels 80a, 80b has a length approximately greater than the length of the corresponding piston 48 and includes a pair of flanges 82a, 82b, as will be described in greater detail in connection with the description of the piston 48.

Figure 6:
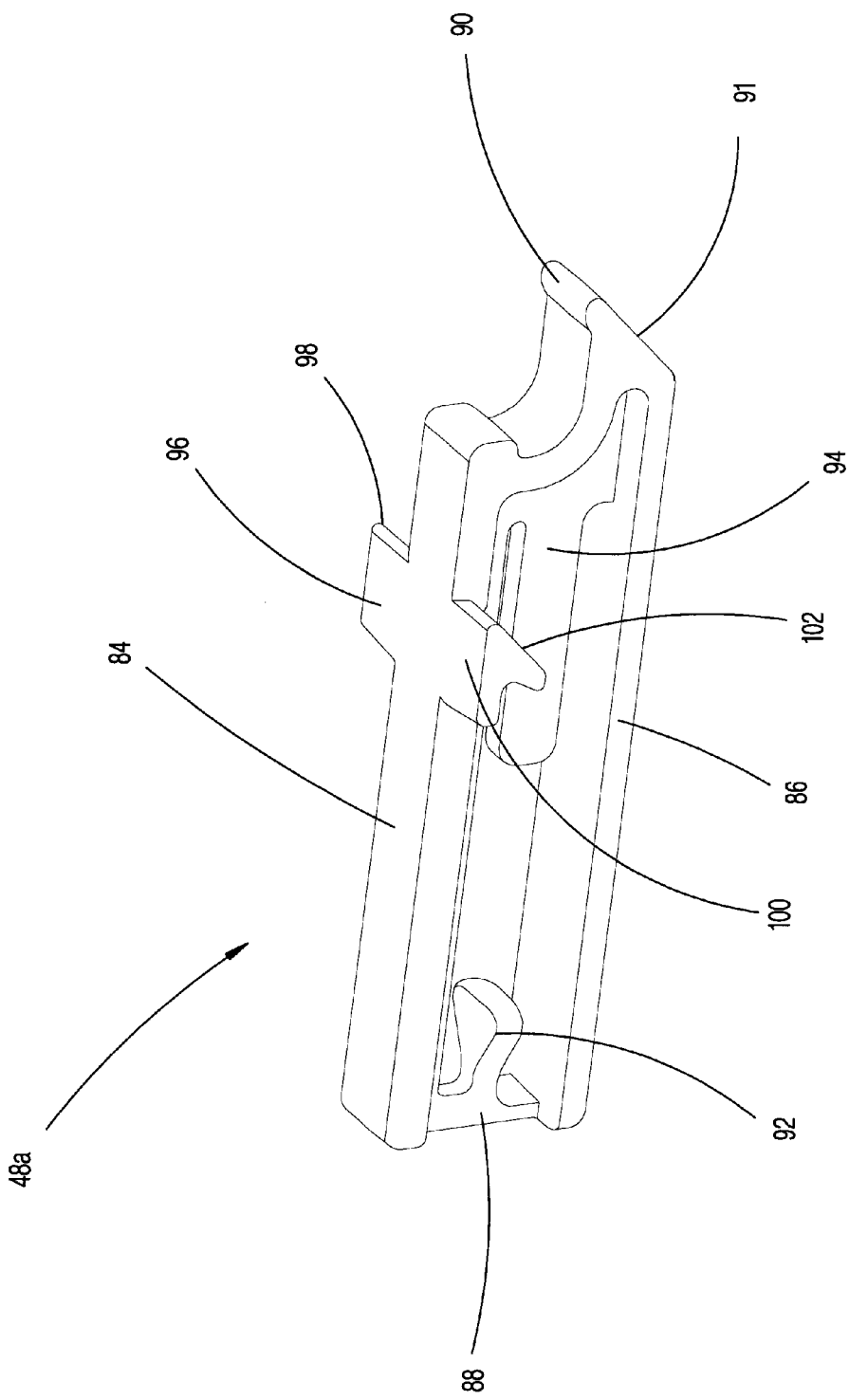
FIG. 6 is a perspective view of a piston.

As best appreciated with reference to FIG. 6, the piston 48 includes an upper member 84 and a lower member 86 parallelly disposed and spaced a distance apart relative to the upper member 84. The upper member 84 and lower member 86 are interconnected by an end member 88 and a hook member 90 having a cam face 91 oppositely disposed relative the end member 88. An abutment member 92 is disposed on the end member 88 and inwardly directed relative to the abutment member 92. Also, a spring alignment member 94 is disposed on the hook portion 90 and is also inwardly directed relative to the piston 48. Accordingly, the abutment member 92 and the spring alignment member 94 are both parallelly disposed between the upper member 84 and lower member 86 of the piston 48. Lastly, the piston preferably includes a protrusion member. As shown in FIG. 6, the protrusion member includes a first protruding edge 96 having a first angled face 98 laterally extending from the piston 48. Oppositely disposed relative to the first protruding edge 96 is a second protruding edge 100 having a second angled face 102 and also extending laterally relative to the piston 48. Preferably, the first angled face 98 and the second angled face 102 are angled relative to the piston 48. Most preferably, the first angled face 98 and the second angled face 102 is angled are correspond to the angle of the bearing surface 68a, 68b of the corresponding triangular portion 66a, 66b. One skilled in the art can appreciate that the interaction of the bearing surface 68a, 68b with the corresponding angled face 98, 102 operate to translate a substantially vertical force applied to the handle 46 into a substantially horizontal force realized upon the respective piston 48.

One of the flanges of the pair of flanges 82a is sized and shaped to be receivable between the upper member 84 and the abutment member 92. Further, the other flange 80b of the pair of flanges 80a, 80b is sized and shaped to be fitted between the abutment member 92 and the lower member 86. In the preferred embodiment, the piston 48 is integrally molded as a single member. However, various features of the piston 48 may be manufactured separately and attached to the piston 48 without departing from the teachings of the present invention.

Figure 4:
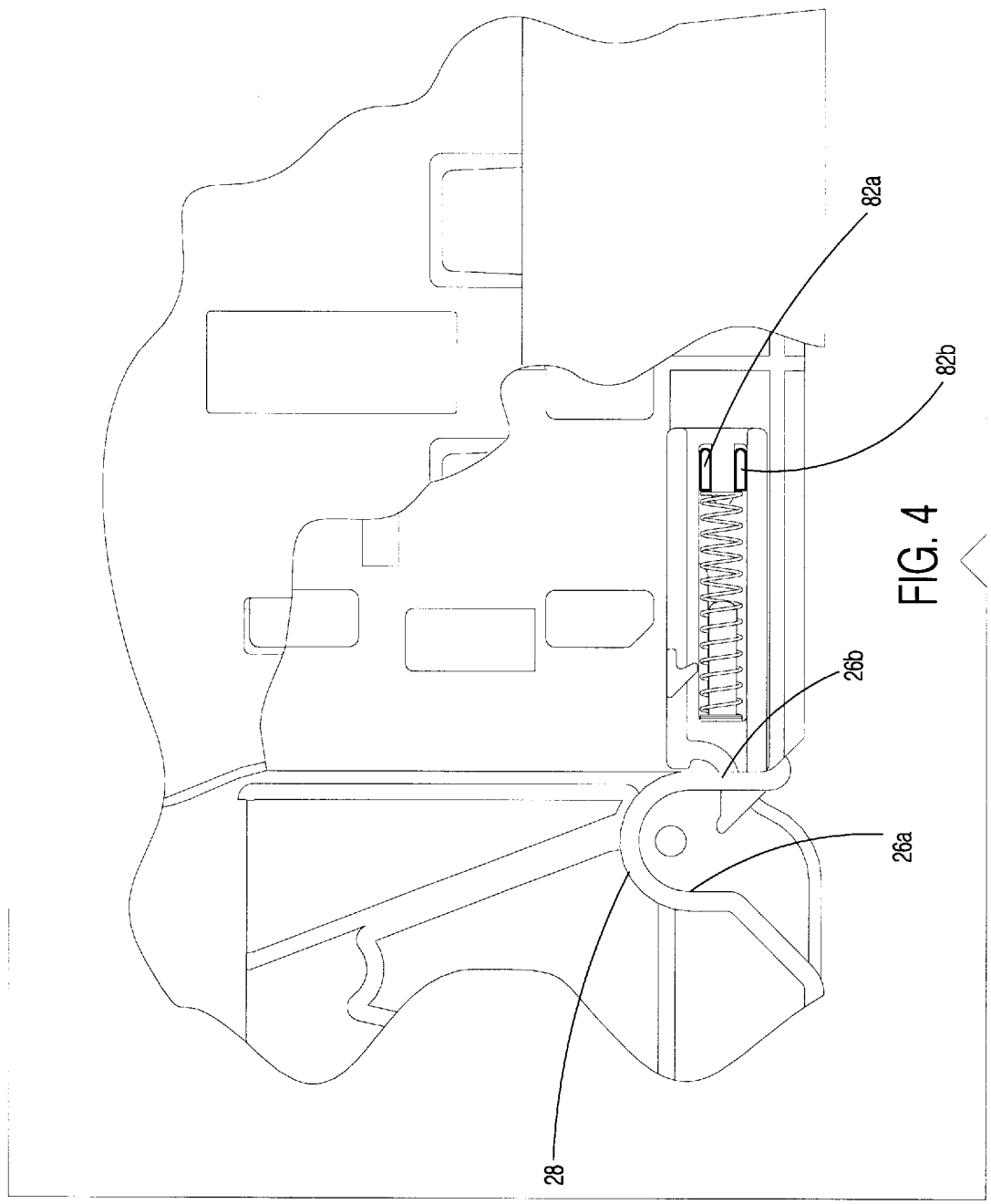
FIG. 4 is a side elevational view of a side wall of the child carrier having a portion of the handle and face plate cut away.
Figure 11:
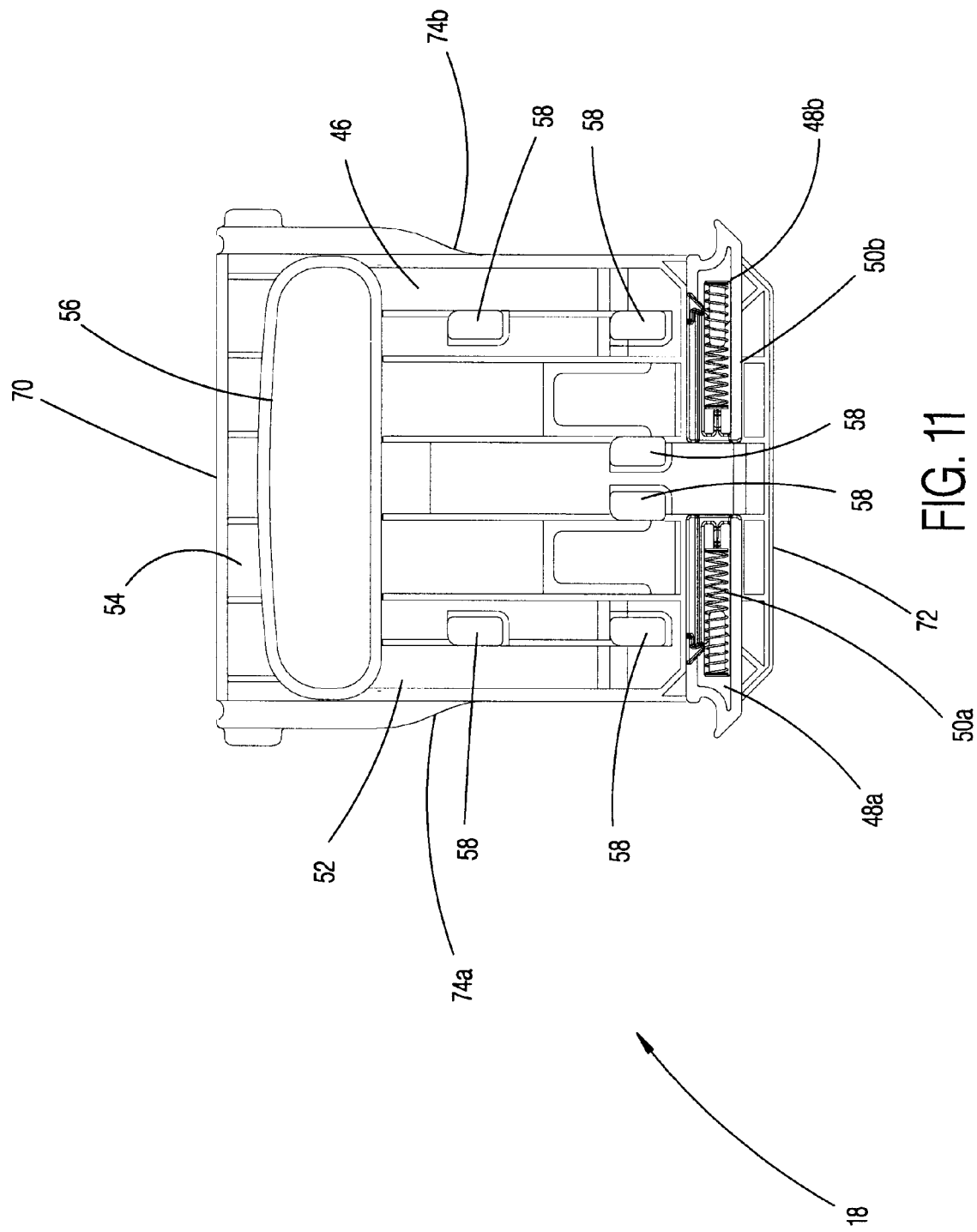
FIG. 11 is a rear elevational view of the handle showing the pistons disposed over the triangular portions of the handle.

Lastly, the at least one spring 50 is operatively interconnected between the at least one piston 48 and the corresponding side wall of the pair of side walls 20a, 20b. Each spring 50 is disposed on a corresponding spring alignment member 94. Preferably, the spring 50 is sized and shaped to be approximately greater than the distance between the end member 88 and hook member 90. As such the piston 48 is biased away from the pair of flanges 82 through the opening, not shown, into the corresponding slot 24a, 24b. As seen in FIG. 4, the hook member 90 of the piston 48 thereby projects into the corresponding slot of the pair of slots 24a, 24b. Preferably, as seen in FIG. 11, the present invention contemplates the use of a pair of pistons 48a, 48b on each side wall of the pair of side walls 20a, 20b for a total of four pistons each projecting into a respective slot 24a, 24b on each side wall 20a, 20b.

In another embodiment of the present invention, the child care device 10 includes an adjustable arm bar 104 which is slidably coupled to the child carrier 14 and at least one arm bar actuator 106 secured to the child carrier 14 and releasably engaging the arm bar 104 such that the arm bar 104 is slidably adjustable relative to the child carrier 14. Accordingly, the child care device 10 may be converted between the stroller orientation (having the arm bar retracted as shown in FIG. 1), and the bassinet configuration (having the arm bar extended as shown in FIG. 2).

Figure 5:
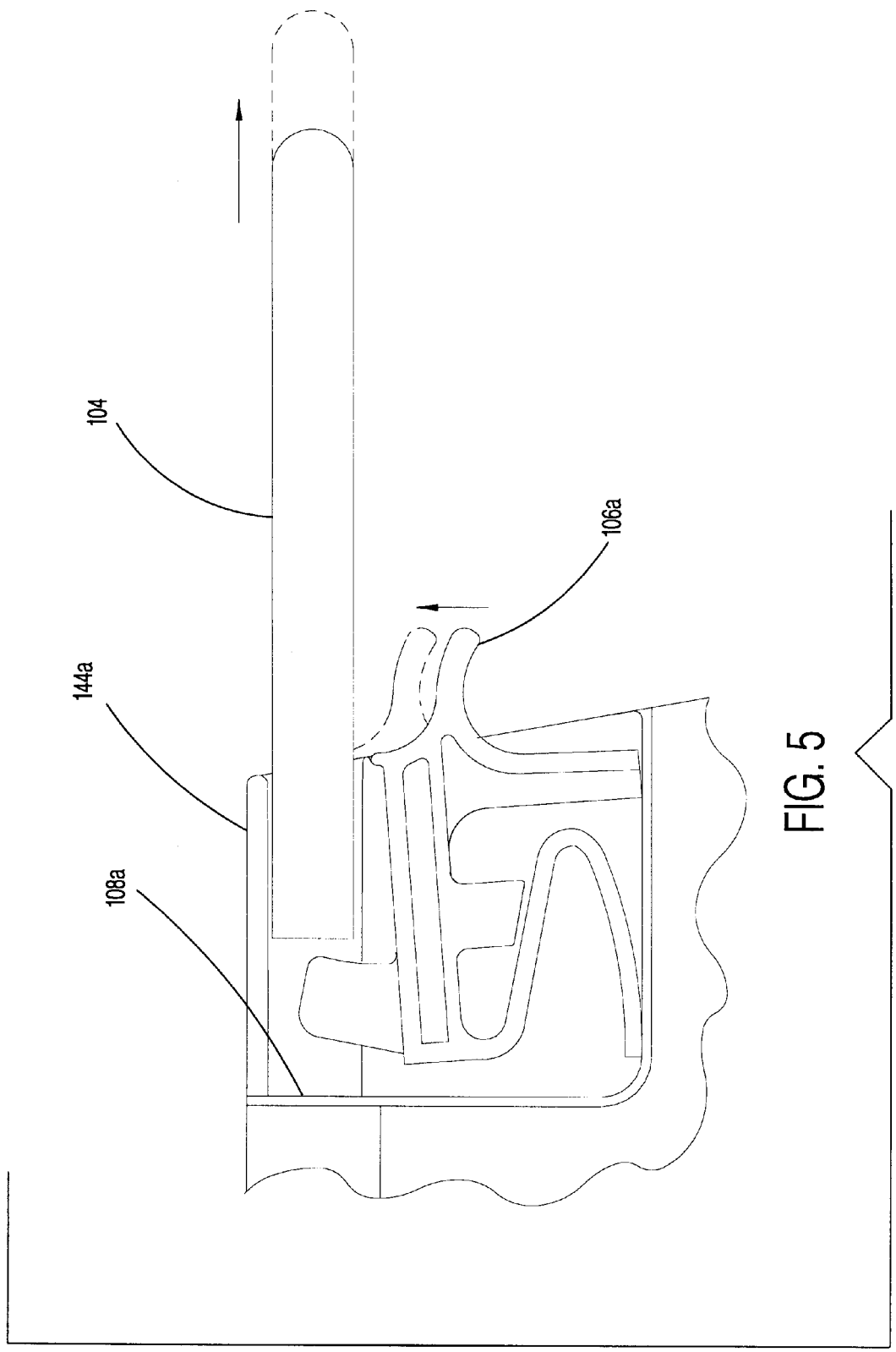
FIG. 5 is a side elevational view of a side wall of the child carrier having a portion of the child carrier cut away around the arm bar exposing an arm bar actuator.

More specifically, the at least one arm bar actuator 106 is a pair of arm bar actuators 106a, 106b. Each arm bar actuator 106a. 106b is disposed on a corresponding side wall of the pair of side walls 20a, 20b. Preferably, the child care device 10 includes a pair of receptacles, only one receptacle 108 is shown in FIGS. 4 and 5 on side wall 20a. However, one can appreciate that a corresponding receptacle, not shown, is similarly disposed on other side wall 20b.

Figure 7:
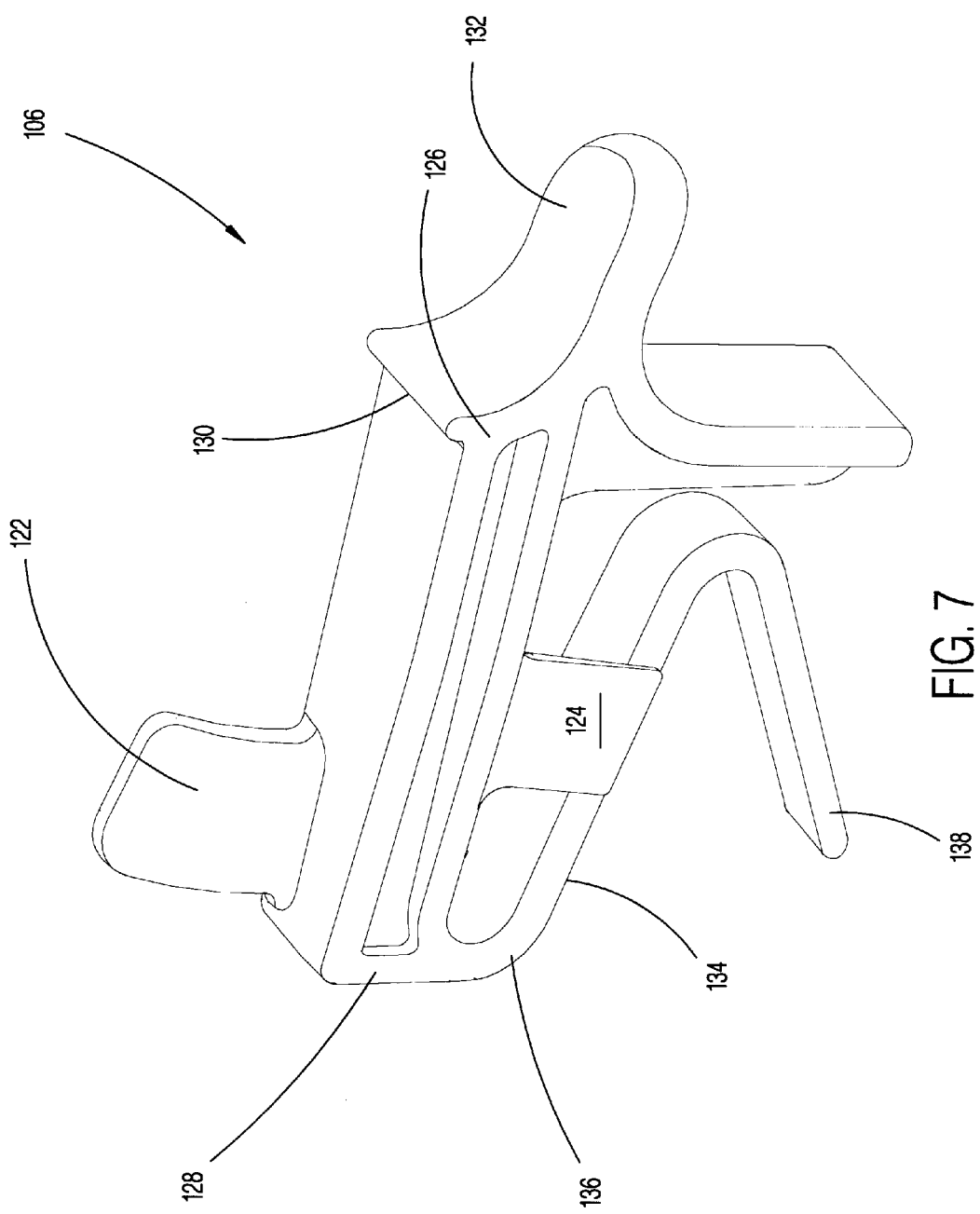
FIG. 7 is a perspective view of the arm bar actuator.
Figure 8:
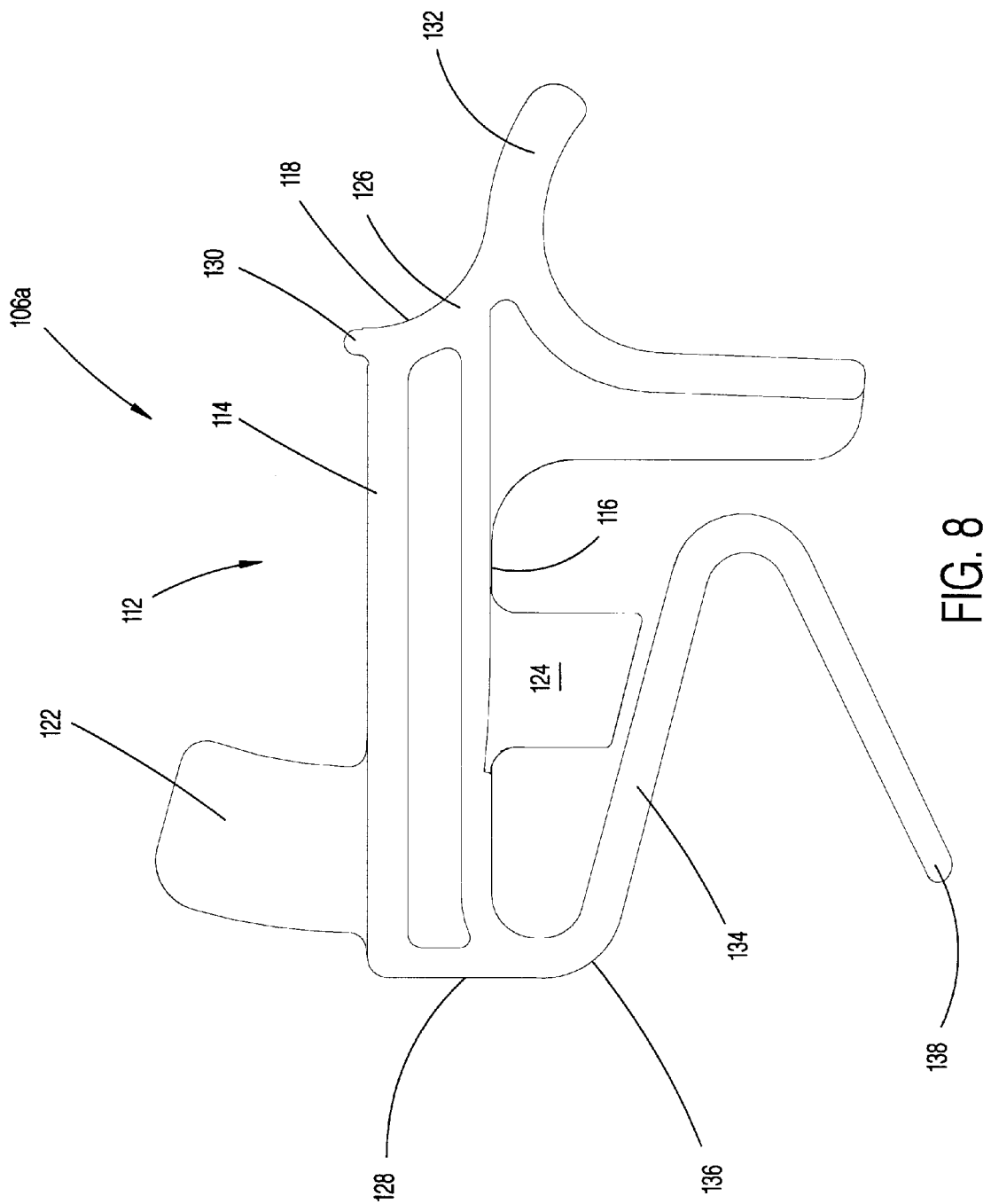
FIG. 8 is a side elevational view of the arm bar actuator.

As seen in FIG. 7, the unique arm bar actuator 106 includes a body 112. The body 112 includes an upper surface 114 and a lower surface 116 oppositely disposed relative to the upper surface 114. The arm bar actuator further includes a first side portion 118 and a second side portion 120 oppositely disposed relative to the first side portion 118. Lastly, the arm bar actuator 106 includes a front edge portion 126 and an oppositely disposed rear edge portion 128. The arm bar actuator 106 further includes an engagement portion 122 disposed on the upper surface 114 and a tab 124 outwardly and angularly extending from the lower surface 116 of the arm bar actuator 106. As seen in FIG. 8, the arm bar actuator 106 further includes a pivot nub 130 disposed on the upper surface 114 proximate the front edge 126. In addition, the arm bar actuator 106 includes a trigger portion 132 disposed on the front edge portion 126 of the body 112. In the preferred embodiment, the trigger portion 132 is generally arcuate in shape.

Figure 9:
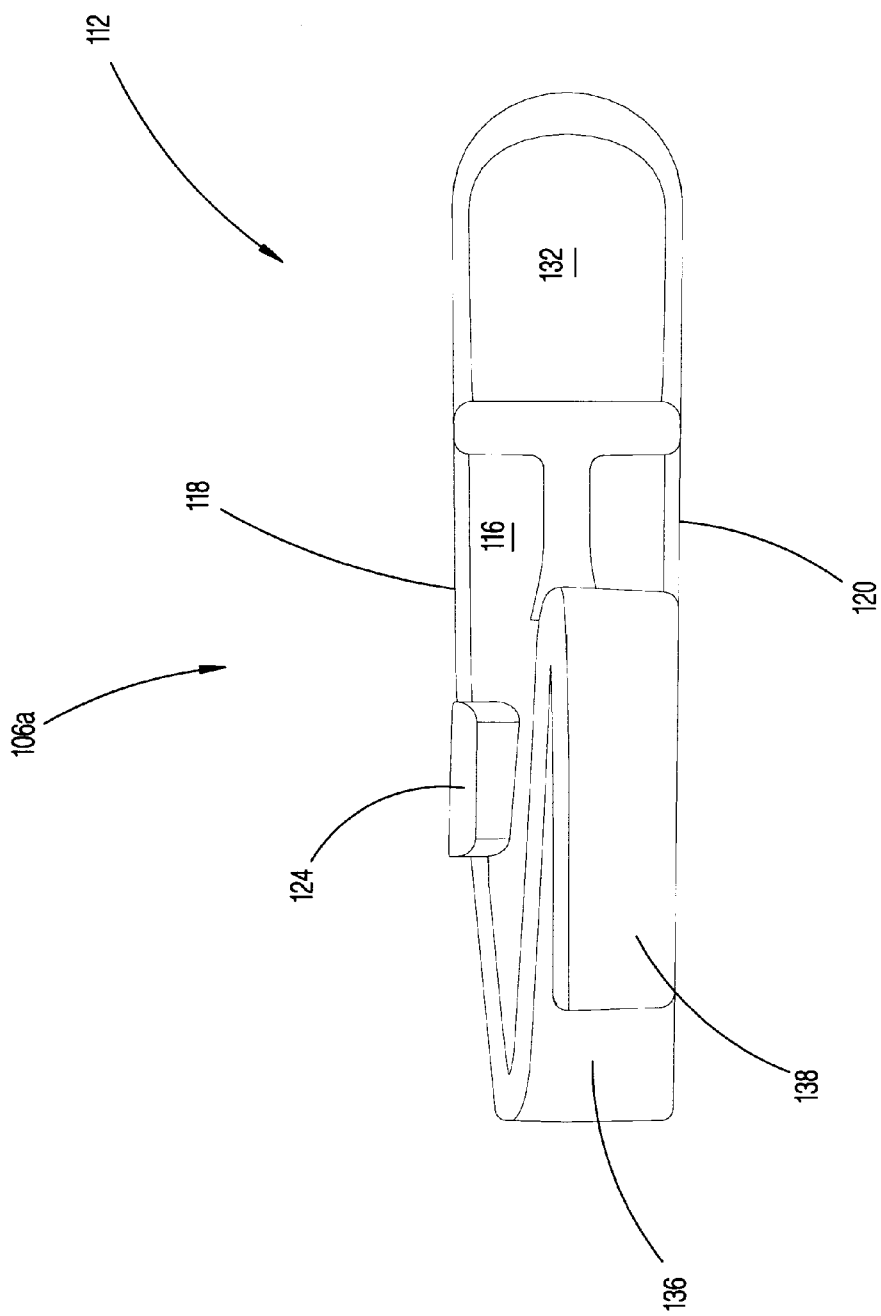
FIG. 9 is a bottom plan view of the arm bar actuator.

Another feature of the arm bar actuator 106 is that it includes a spring portion 134 which is attached to the rear edge portion 128 of the body 112. The spring portion 128 includes an attachment end 136 interconnected to the rear edge portion 128 of the body 112. Oppositely disposed relative to the rear edge portion 128 is a bearing end 138. The bearing end 138 is adapted to springably engage the corresponding receptacle 108. The spring portion 134 is generally V-shaped along its length between the attachment portion 136 and the bearing portion 138. Preferably, as seen in FIG. 9, the spring portion 134 tapers inwardly along its length from the attachment portion 136 to the bearing portion 138. Most preferably, the engagement portion 122 is laterally offset towards the first side portion 118. In the preferred embodiment, the arm bar actuator 106 is integrally formed as a single member.

Figure 12:
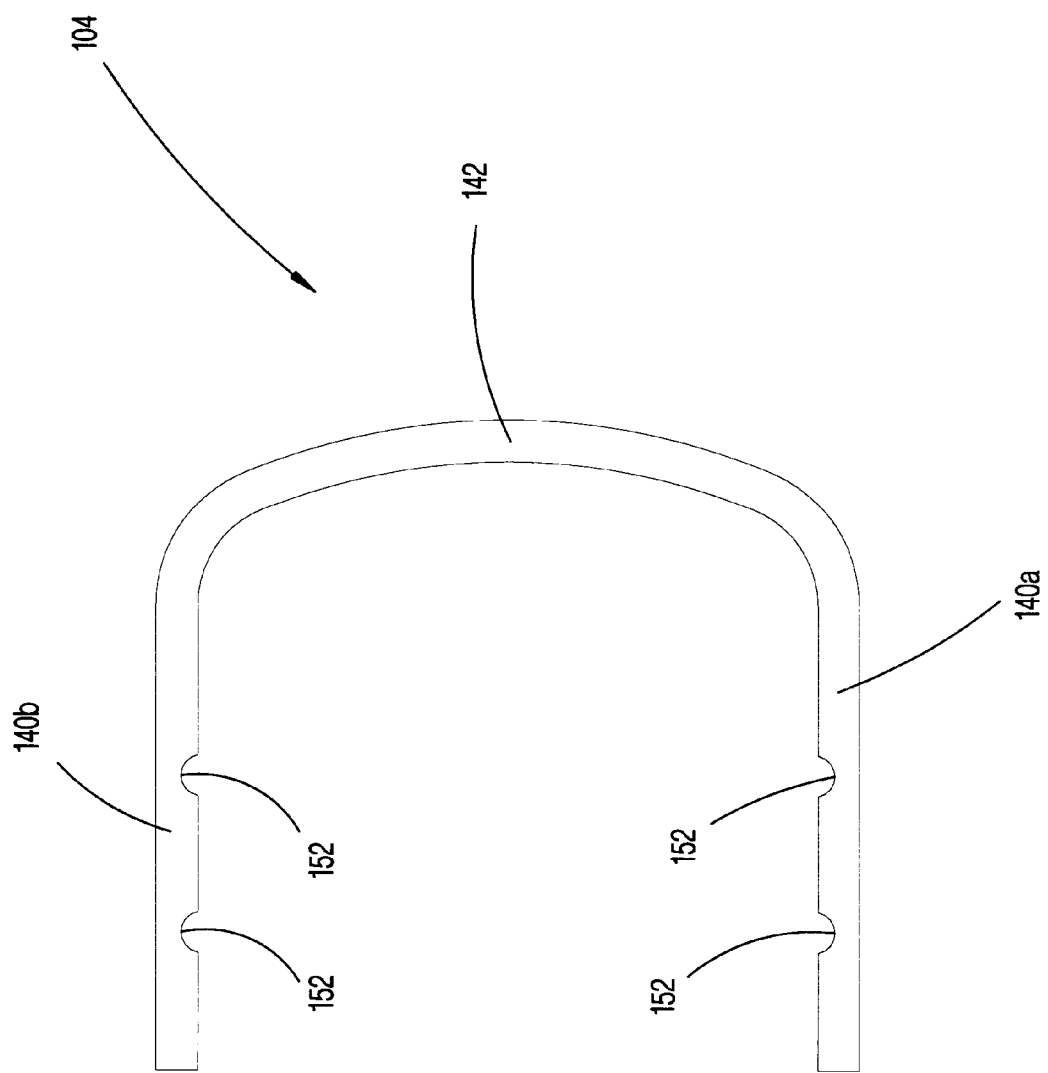
FIG. 12 is a bottom plan view of the arm bar.
Figure 13:
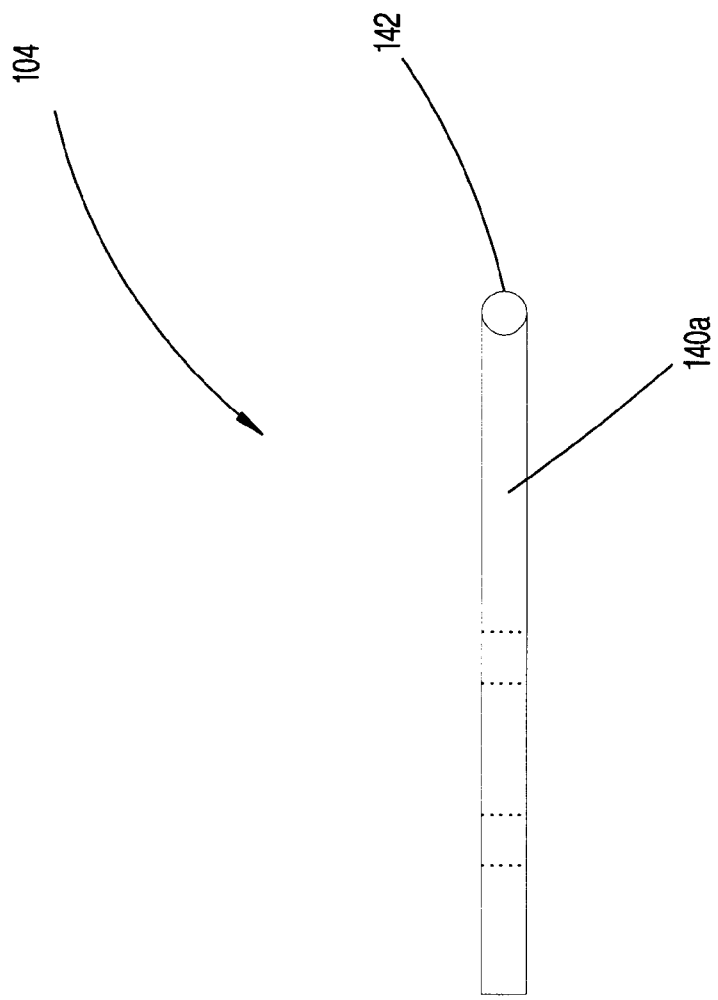
FIG. 13 is a side elevational of the arm bar.

As seen in FIGS. 12 and 13, the arm bar includes a pair of members 140a, 140b. Interconnected therebetween is a cross member 142. Preferably, the arm bar 104 is generally U-shaped as seen in FIG. 14. The arm bar 104 includes a plurality of indentations 152 on the pair of members 140a, 140b. Preferably, each indentation of the plurality of indentations 152 are aligned relative to one another and disposed on the pair of members 140a, 140b towards the interior of the arm bar 104. In addition, the child carrier 14 includes a pair of sleeves 144a, 144b on a corresponding side wall 20a, 20b. Preferably, each sleeve 144a, 144b is square in cross-section. Lastly, the receptacle 108 includes an extension (not shown) which cooperates with the tab 124 to secure the arm bar actuator 106 within the receptacle 108.

As shown in FIG. 1, the child carrier device 10 further includes a canopy (not shown) attached to the child care device. The canopy includes a fastener mechanism 146 releasably connecting the canopy to each of the side walls 20a, 20b. The canopy further includes a first bail 148 and a second bail 150 both of which are pivotably connected to the fastener mechanism 146.

In use, the user of the present invention is provided with a device which is versatile and uncomplicated to use. The user may attach the child carrier 14 to the frame 12 simply by lowering the child carrier 14 over the frame 12. Specifically, the user will lower the child carrier 14 onto the frame 12 such that the pair of slots 24a, 24b on each side wall of the pair of side walls 20a, 20b is aligned over the pair of posts 42a, 42b of each support member 40a, 40b. As the child carrier 14 is lowered onto the support members 40a, 40b, each post 42a, 42b contacts the cam face 91 of the corresponding piston 48 and urges the piston 48 inward into the corresponding channel 80a, 80b. In so doing, the corresponding spring 50 is compressed between the pair of flanges 82a, 82b and the hook member 90. After the respective post 42a, 42b overcomes the hook member 90, the piston 48 is urged by the spring 50 outward thereby preventing the respective post 42a, 42b from undesirably escaping from the respective slot 24a, 24b.

In order to disconnect the child carrier 14 from the support mechanism 16, the gripping portion 54 may be easily grasped by the user and actuated by pulling upward thereon. In so doing, the handle 46 is moved upward relative to the respective side wall 20a, 20b. In response to the motion of the handle 46, the bearing surface 68a, 68b slides along the angled face 98, 102 disposed within the corresponding depression 64a, 64. In response, the piston 48 is thereby urged away from the corresponding slot of the pair of slots 24a, 24b.

Also in use, the arm bar 104 may be easily telescopically adjusted between a variety of positions. To do so, the user will digitally grasp the trigger portion 132 and pull upward thereon. In response, the arm bar actuator 106 is pivoted on pivot nub 130 such that the spring portion 134 is compressed and engagement portion is pivoted out of engagement with the arm bar 104. With the engagement portion 122 disengaged from the arm bar 104, the arm bar 104 may be telescopically adjusted along the sleeve 144 of each side wall 20a, 20b by the user. Once the trigger portion 132 is released by the user, the spring portion 134 urges the engagement portion 122 back into engagement with the arm bar 104.

One advantage of the present invention is the child care device 10 provides the user with substantial versatility. One such feature of the above disclosed invention is that the child carrier 14 is reversible. Specifically, the child carrier 14 may be released, as described above and then rotated 180 degrees and then reattached. Accordingly, the user of the present device may orient the child carrier 14 such that the child faces away from the frame of the child care device 10. Alternatively, the child care device may be rotated 180 degrees such that the child faces towards the frame 12 of the child care device 10.

Another advantage inherent in the present invention is that the child care device 10 is that the back rest 30 may be pivoted between a fully upright position to a fully reclined position by pivoting the back rest 30 about the rooster tail 32. To still further enhance the versatility of the present invention, the arm bar 104 may be easily actuated by the user. The arm bar 104 may be fully retracted such as in the stroller configuration of FIG. 1. Alternatively, at the option of the user, the arm bar 104 may be extended in the as in the bassinet configuration of FIG. 2. The unique arm bar actuator 106, in the preferred embodiment, includes an integrally molded spring portion 134. In the preferred embodiment, the spring portion 136 is integrally molded thereby reducing the overall number of parts utilized in the arm bar actuator 106. Uniquely, the spring portion 134 tapers inwardly from the attachment portion 136 to the bearing portion 138. Accordingly, the rigidity is reduced near the bearing portion 138 where flexibility is desirable rather than proximate the attachment portion 136 where rigidity is desirable.

Further enhancing the versatility of the present invention, the indentations 152 are aligned along the interior of the arm bar 104. Accordingly, the arm bar 104 is reversible. More specifically, the arm bar 104 may be secured in place with member 140a received in sleeve 144a and member 140b received in sleeve 144b. Alternatively the arm bar 104 may be secured in place with member 140a received in sleeve 144b and member 140b received in sleeve 144a.

One skilled in the art can appreciate that the above disclosed device provides for a substantial degree of versatility while also minimizing the complexity of operating the present invention. Still a further advantage of the present invention is that the above described advantages is achieved while also minimizing the amount of parts necessary. In the preferred embodiment, the piston 48 and the arm bar actuator 106 are integrally molded as a single element. One skilled in the art can best appreciate that utilizing such members will substantially reduce manufacturing costs, assembly costs as well as reduce the opportunity for mechanical failure due to the utilization of multiple separated members.

While the above describes the preferred embodiment of the invention, the invention is not intended to be so limited. Other embodiments, which will be apparent to those skilled in the art, which utilize the teachings herein set forth, are intended to be within the scope of the present invention.

What is claimed is:

1. A child care device:
   a flame;
   a child carrier having a pair of side walls and a bottom portion interconnected therebetween, each said side wall including at least one slot;
   a support mechanism attached to the frame, said support mechanism including a pair of supports, each said support including at least one post extending therefrom sized to be receivable within said at least one slot; and
   a release mechanism interconnecting the child carrier to the support mechanism, the release mechanism including at least one handle disposed adjacent a corresponding side wall of said pair of side walls, said release mechanism further including at least one piston disposed between said side wall and said release mechanism and extending into said at least one slot such that said post is releasably secured within said slot.

2. A child care device as recited in claim 1, wherein said at least one slot is approximately U-shaped in cross section.

3. A child care device as recited in claim 2, wherein said at least one slot is defined by a pair of side portions and a radiused portion interconnected between the side portions.

4. A child care device as recited in claim 3, wherein said slot includes an opening through at least one of said side portions sized to receive said at least one piston.

5. A child care device as recited in claim 1, wherein said piston comprises:
   an upper member;
   a lower member parallelly disposed relative to the upper member and spaced a distance apart from said upper member;
   a end member interconnecting the upper member to the lower member; and
   a hook member oppositely disposed relative to the end member and interconnecting the upper member to the lower member.

6. A child care device as recited in claim 5, wherein said piston further comprises:
   an abutment member inwardly extending from said end member and disposed between said upper member and said lower member.

7. A child care device as recited in claim 6, wherein said piston further comprises:
   a spring alignment member inwardly extending from said hook member and disposed between said upper member and said lower member.

8. A child care device as recited in claim 7, wherein said piston further comprises:
   a protrusion member disposed on the upper member and transversely disposed relative to said upper member, said protrusion having an angled face angularly disposed relative to said upper member.

9. A child care device as recited in claim 8, wherein said angular face is angled approximately 45 degrees relative to said upper member.

10. A child care device as recited in claim 9, wherein said protrusion member comprises:
    a first protrusion having a first angled face; and
    a second protrusion having a second angled face.

11. A child care device as recited in claim 10, wherein said release mechanism further includes at least one spring fitted on said spring alignment member, said spring having a first end and a second end and a length defined therebetween.

12. A child care device as recited in claim 11, wherein said length of said spring is approximately greater than the distance between said hook portion and said abutment portion.

13. A child care device as recited in claim 1, wherein said handle comprises:

a body;

a gripping portion attached to the body; and a plurality of L-shaped members, each L-shaped member having a first portion approximately perpendicularly disposed relative to the body and a second portion attached to the first portion, said second portion being approximately parallelly disposed relative to the body.

14. A child care device as recited in claim 13, wherein said handle further comprises:

at least one depression disposed on the body; and at least one triangular portion disposed adjacent said at least one depression of, said triangular portion providing a bearing surface.

15. A child care device as recited in claim 14, wherein said at least one depression is a pair of depressions disposed on the body; and wherein said at least one triangular portion is a pair of triangular portions, each triangular portion being adjacent a corresponding depression, each said triangular portion providing a bearing surface.

16. A child care device as recited in claim 15, wherein said bearing surface is correspondingly angled relative to the angle of the corresponding angled face of the piston.

17. A child care device as recited in claim 16, wherein said at least one side panel further comprises:

a plurality of corresponding L-shaped members disposed on the face corresponding to the L-shaped members.

18. A child care device as recited in claim 17 wherein said at least one side panel further includes at least one channel, said channel being sized and shaped to receive said at least one piston.

19. A child care device as recited in claim 18 wherein said at least one channel is a pair of channels disposed proximate one another.

20. A child care device:

a frame;

a child carrier having a pair of side walls and a bottom portion interconnected therebetween, the child carrier further including a backrest connected to the side walls, each said side wall including at least one slot, said slot being approximately U-shaped, said slot being defined by a pair of side portions and a radiused portion interconnected between the side portions, said slot further including an opening through at least one of said side portions;

a support mechanism attached to the frame, said support mechanism including a pair of supports, each said support including at least one post extending therefrom sized to be receivable within said at least one s lot;

a release mechanism interconnecting the child carrier to the support mechanism, the release mechanism including at least one handle disposed adjacent a corresponding side wall, said release mechanism further including at least one piston disposed between said side wall and said handle and extending into said at least one slot such that said protrusion is releasably secured within said slot by said piston, said piston including an upper member a lower member parallelly disposed relative to the upper member and spaced a distance apart relative to the upper member, said piston further including an end member interconnecting the upper member to the lower member, said piston further including a hook portion oppositely disposed relative to the end member and interconnecting the upper member to the lower member, said piston further including an abutment member inwardly extending from said end member and disposed between said upper member and said lower member, said piston further including a spring alignment member inwardly extending from said hook portion and disposed between said upper member and said lower member, said piston further including a protrusion having an a first protrusion having a first angled face and a second protrusion having a second angled face, said handle including a body and a gripping portion attached to the body, said handle further including a pair of depressions and a pair of triangular portions proximate a corresponding depression, each said triangular portion providing a bearing surface, each said bearing surface having a corresponding angle relative to the angle of the angled face of the corresponding piston;

a pair of springs, each spring being fitted on an alignment member of said corresponding piston, said spring having a first end and a second end, said spring having a length approximately greater than the distance between said hook portion and said abutment portion of said corresponding piston.

21. A child care device:

a frame;

a child carrier having a pair of side walls and a bottom portion interconnected therebetween, each said side wall including at least one slot;

a support mechanism attached to the frame, said support mechanism interconnecting said child carrier to said frame;

an adjustable arm bar being slidably coupled to said child carrier; and at least one arm bar actuator secured to the child carrier, said arm bar actuator releasably engaging said arm bar.

22. A child care device as recited in claim 21, wherein said at least on arm bar actuator is a pair of actuators, each actuator being disposed on a corresponding side wall of said child carrier.

23. A child care device as recited in claim 22, wherein said arm bar actuator further comprises:

a body, said body having an upper surface and an oppositely disposed lower surface, said body further having a front end portion and a rear end portion oppositely disposed relative to the front end portion, said body further including a first side portion and a second side portion oppositely disposed relative to the first side portion; and an engagement portion disposed on said upper surface of said body.

24. A child care device as recited in claim 23, wherein said arm bar actuator further comprises:

an spring connected to the lower surface of the arm bar actuator.

25. A child care device as recited in claim 24, wherein said spring portion is integrally formed with said lower surface of said arm bar actuator.

26. A child care device as recited in claim 25, wherein said spring is approximately V-shaped.

27. A child care devices recited in claim 25, wherein said spring comprises:

an attachment portion interconnecting the spring with said body; and a bearing portion oppositely disposed along said spring relative to said attachment portion.

28. A child care device as recited in claim 27, wherein said spring inwardly tapers along said spring from said attachment portion to said bearing portion.

29. A child care device as recited in claim 28, wherein said spring further includes a pivot nub disposed on said upper surface of said body.

30. A child care device as recited in claim 29, wherein said aim bar actuator further includes a trigger portion disposed on said front edge portion of said body.

31. A child care device as recited in claim 30, wherein said arm bar actuator further comprises:
   a tab outwardly and angularly extending from said lower surface of said arm bar actuator.

32. A child care device as recited in claim 30, wherein said trigger member is approximately arcuate in shape.

33. A child care device as recited in claim 32, wherein said arm bar includes a pair of members.

34. A child care device as recited in claim 33, wherein said arm bar is generally U-shaped, said arm bar further including a cross member interconnecting the pair of members.

35. A child care device as recited in claim 33, said child carrier further including a pair of sleeves proximate the pair of receptacles, each said sleeve of said pair of sleeves being sized and shaped to receive a corresponding member of said pair of members.

36. A child care device as recited in claim 33, wherein each member of said pair of members includes a plurality of indentations.

37. A child care device as recited in claim 34, wherein said plurality of indentations is a pair of indentations.

38. A child care device:
   a frame;
   a child carrier having a pair of side walls and a bottom portion interconnected therebetween, the child carrier further including a backrest connected to the side walls;
   a support mechanism attached to the frame, said support mechanism interconnecting said child carrier to said frame;
   an adjustable arm bar being slidably coupled to said child carrier; and
   a pair of arm bar actuators secured to the child carrier, each said arm bar actuator releasably engaging said arm bar, each said arm bar actuator being coupled within the corresponding receptacle, each said arm bar actuator comprising a body, said body having an upper surface and an oppositely disposed lower surface, said body further including a front end portion and a rear end portion oppositely disposed relative to the from end portion, said arm bar actuator further including a first side portion and a second side portion oppositely disposed relative to the first side portion, said arm bar actuator further including an engagement portion disposed on said upper surface of said body and a tab disposed on said lower surface of said body, said arm bar actuator further including a spring portion integrally formed with said body; and
   an arm bar slidably coupled with said child carrier.

39. A child care device comprising:
   a frame;
   a child carrier having a pair of side walls and a bottom portion interconnected therebetween, each said side wall including at least one slot;
   a support mechanism attached to the frame, said support including a pair of supports, each said support including at least one post extending therefrom sized to be receivable with said at least on slot;
   a release mechanism interconnecting the child carrier to the support mechanism, the release mechanism including at least one handle disposed adjacent a corresponding side wall of said pair of side walls, said release mechanism further including at least one piston disposed between said side wall and said release mechanism and extending into said at least one slot such that said post is releasably secured within said slot;
   an adjustable arm bar being slidably coupled to said child carrier; and
   at least one arm bar actuator secured to the child carrier, said arm bar actuator releasably engaging said arm bar.

* * * * *